United States Patent [19]

Schott, Jr.

[11] 4,059,381

[45] Nov. 22, 1977

[54] TOGGLE PRESS

[75] Inventor: Charles M. Schott, Jr., Gloucester, Mass.

[73] Assignee: Gloucester Engineering Co., Inc., Gloucester, Mass.

[21] Appl. No.: 747,934

[22] Filed: Dec. 6, 1976

[51] Int. Cl.[2] ........................ B29C 3/00; B29C 17/00; B30B 1/16

[52] U.S. Cl. ................................. 425/406; 425/451.6; 425/387.1; 425/590

[58] Field of Search ....... 425/451.5, 451.6, DIG. 220, 425/DIG. 222

[56] References Cited

U.S. PATENT DOCUMENTS

| | | | |
|---|---|---|---|
| 3,166,790 | 1/1965 | Keyes | 425/DIG. 220 |
| 3,340,574 | 9/1967 | O'Brien et al. | 425/DIG. 220 |
| 3,346,923 | 10/1967 | Brown et al. | 425/DIG. 220 |
| 3,504,403 | 4/1970 | Brown et al. | 425/DIG. 222 |
| 3,632,272 | 1/1972 | Herbener | 425/387 R |
| 3,736,092 | 5/1973 | Konig et al. | 425/451.6 |
| 3,854,856 | 12/1974 | Herbst et al. | 425/451.6 X |

*Primary Examiner*—J. Howard Flint, Jr.

[57] ABSTRACT

A toggle press having a lower platen assembly constructed to provide a convenient working level for the platen in its open position. The fixed axis of the toggle linkage is mounted immediately adjacent to the ground and the actuator for the toggle linkage is inclined in the direction downwardly progressing away from the toggle actuating axis. The press is constructed with a beam which includes a base plate, this base plate having an extension upon which the fixed pivot of the toggle linkage is mounted, below the neutral axis of the beam. Additional structural features enable compensating deflection and self-alignment of the toggle bearing under load.

11 Claims, 6 Drawing Figures

FIG 3
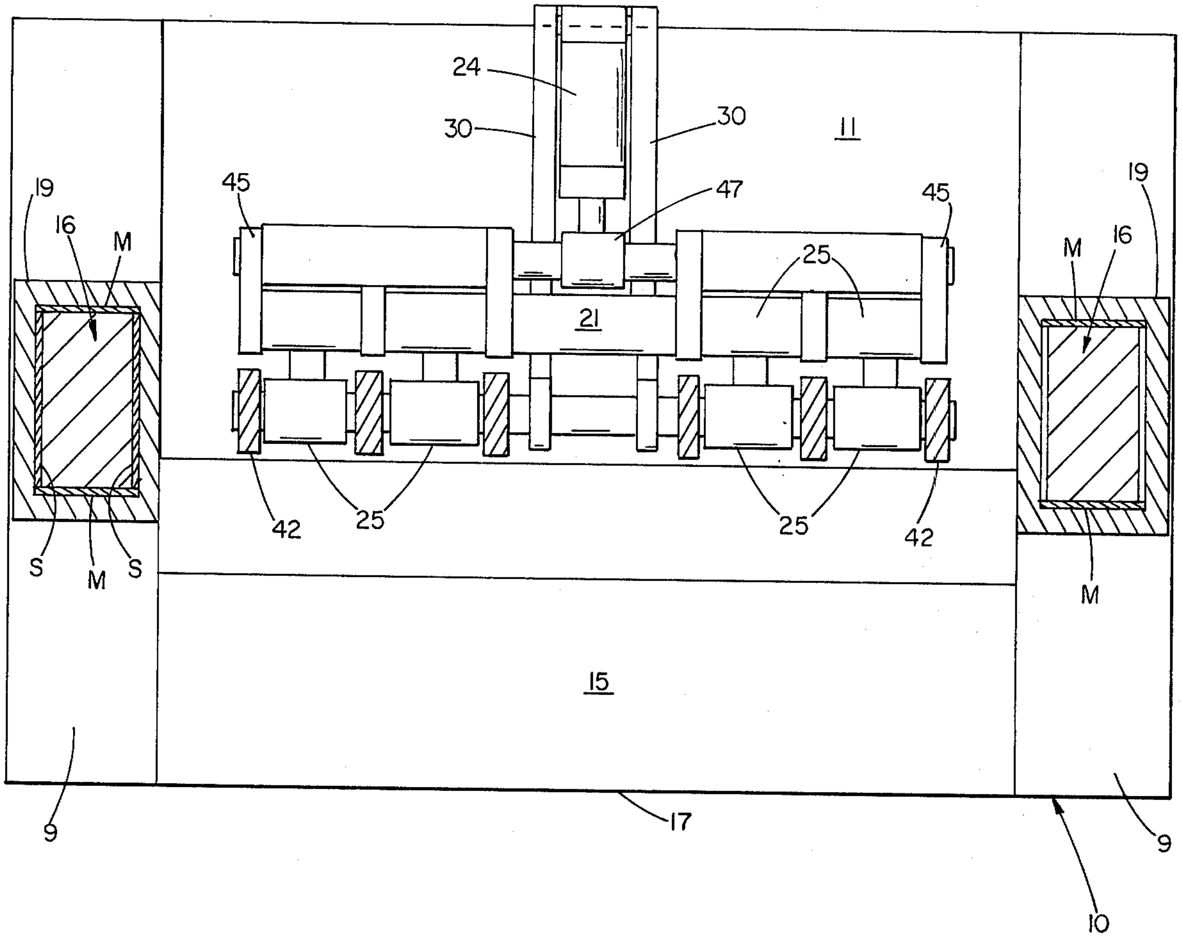
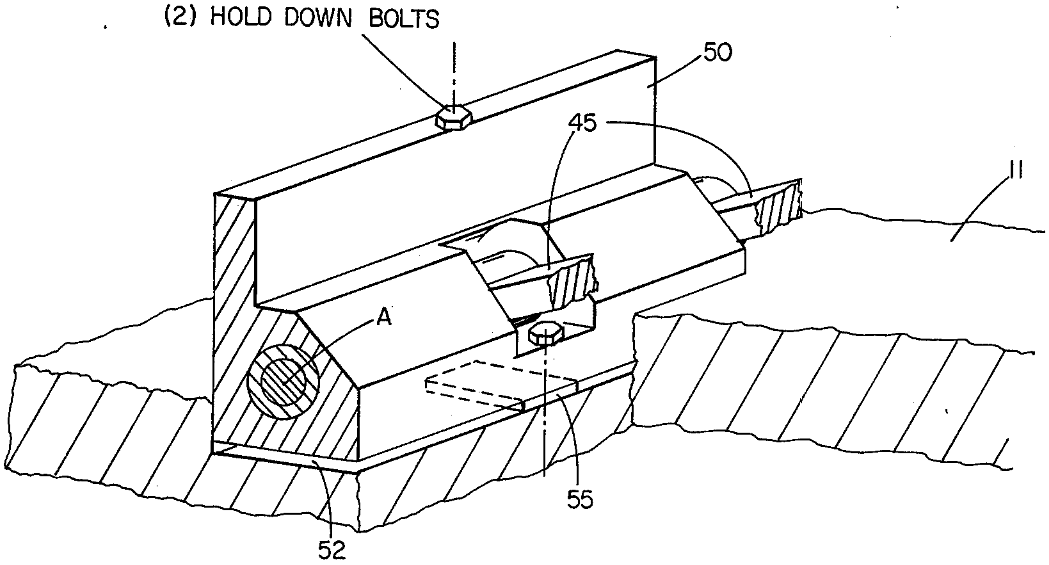
FIG 4

FIG 5
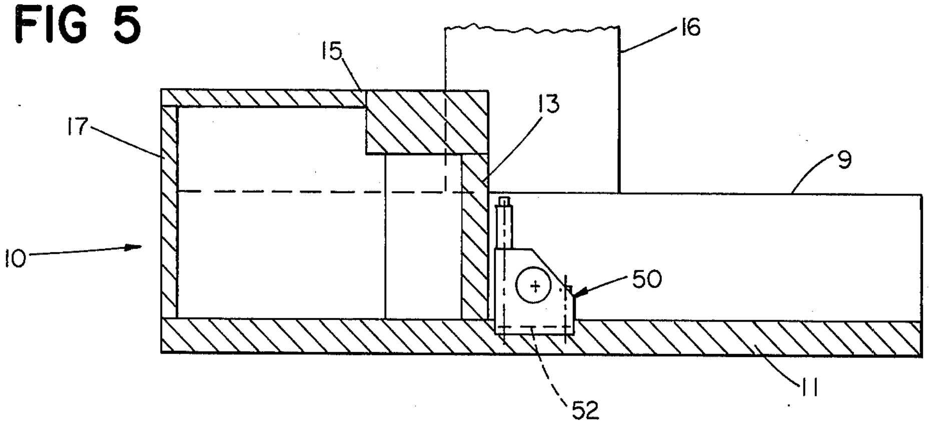
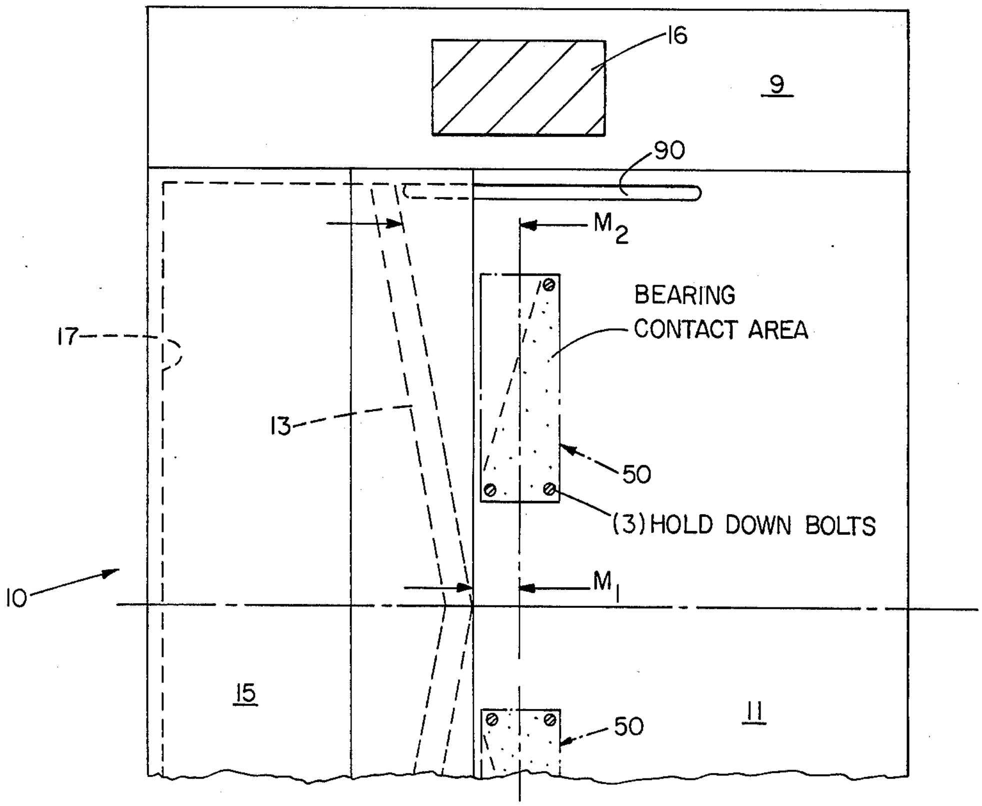
FIG 6

TOGGLE PRESS

This invention relates to toggle-actuated presses and is particularly suited to large size presses used in the forming of heat-softened resinous material. While not so limited in many of its aspects, the invention is particularly important for use in thermo-forming presses for forming large resinous plastic sheets into such useful items as interior headliners or door covers for automobiles and for food trays and similar packaging items.

Objects of the invention include the provision of toggle presses which, for a given capacity, are smaller in overall dimensions; are more convenient to ship, maintain and operate; and offer improved performance.

A specific object is to provide a thermo-forming press suitable for a mold size four feet square, and having a relatively long stroke for both upper and lower platens of the order of ten inches for each platen. For such a press relatively low actuating force is required to move the platen to the fully closed position to achieve pressures of the order of 50 tons, but reasonably high forces are required at the fully opened position. Toggle presses of prior design have provided such operation but have done so in a cumbersome way with a very tall overall structure and high parting plane level (where the web enters and where the platens meet), that have adversely affected installation and operational cost.

An important object of the present invention is to lower the parting plane to a level more convenient for the operator, for inspection of the web passing through the machine and also for installation of molds on the platens, e.g., to a height a foot lower than certain prior art presses. According to the invention I have realized that such an improved machine can be obtained through novel construction of the base of the press. The base has to have a fair amount of beam stiffness to keep the bearing loads uniform on the toggle, within acceptable limits. According to the invention the toggle for the lower platen is mounted to the side of the beam, away from the direction toward which the toggle swings. According to the invention most of the beam across the machine provides stiffness to the base and is offset from the toggle structure and not underneath it while a continuation of the base structure under the toggle bearings is provided in the form of a very heavy plate.

According to the invention it is also recognized as desirable to open the toggles of the press farther than normal, to produce, e.g., a ten inch stroke on each toggle within a compact space. In such construction when the toggle is fully open, the links form an equalateral triangle, 60° on both sides, and when of course the toggle is closed all the pivot points are in a vertical center line and the pivot point on the platen moves up 10 inches from its open position. Another feature of the invention relates to the toggle linkage. One of the problems in a toggle is that the force ratio is high when the toggle is open and the farther open it goes, the higher this ratio becomes. This refers to the ratio of the force the hydraulic cylinder or other actuator must produce compared to the opening or closing forces. This is not a problem when the toggle is fully closed and the clamping force is infinite because of the geometrical relation of the links. Because of this mechanical advantage of the toggle linkage the size of an actuator required to obtain high clamping forces is not great, particularly if low friction bearings are employed. However, when the toggle is fully open, in this case 60°, the actuator force using prior art arrangements must be 3½ times the toggle force. This means that even for a small machine for a large stroke, a large toggle actuating cylinder and correspondingly heavy associated parts are required, or the additional complexity of a counterbalance cylinders is added, i.e., to apply additional force to start the platen closed when the toggle is at its greatest disadvantage.

According to the invention, I have realized that this disadvantage can be offset by angling the cylinder or other actuator relative to the mid-plane of the toggle angle. Were this the only consideration, the optimum angle would be about 60° from the mid plane, perpendicular to the frame link of the toggle assembly. While other considerations, e.g., the desired lowered height, does not afford sufficient room to do that in the preferred embodiment, an angle of about 20°-30° is employed to obtain some of this advantage for the lower platen 20° and the upper platen 30°. This angle enables the disadvantage to be reduced to 2.5:1 and 2:1. And this makes it possible to obtain the desired longer stroke of the toggle and platen without additional counterbalance cylinders or using unnecessarily large actuators. I have noted that though this involves loss of some force at the other end of the stroke when the press is fully closed, because the actuator does not act directly on the pivot, the penalty paid is relatively insignificant because more than sufficient force is available there for the purpose of this invention, even for a press capable of producing 50 tons clamping force. The lesser angle used for the lower platen is made possible because the lower cylinder has its full piston area working while the upper cylinder has less area because of the piston rod.

The provision of the mentioned special angle is coupled with a special lever or "whiffletree" arrangement for absorbing the reaction forces of the hydraulic cylinder or other actuator. This is accomplished by employing a lever, to the midpart of which the actuator is connected, and a link. The important feature involves placement of the fixed end of the lever closer to the line between the platen and frame toggle axes, than to the line between the other two axes of the lever. This results in bringing the load back to the place to which it has been applied. By thus absorbing the actuator load within the linkage, the load is not transferred to the platen guides thereby saving wear.

In respect of the lower platen of the preferred embodiment, the fixed point is not positioned on the line of centers, but rather somewhat to the side, while enjoying much of the advantage, and still enabling use of a low structure as desired for the reasons mentioned. Similarly, a shallower angle of cylinder inclination is employed, thus achieving an improved force ratio while still leading to the lower height of the parting plane.

I have also realized that, as in the preferred embodiment, despite use of a beam 17 inches high, the beam can deflect a sufficient amount under the toggle loads to throw the bearing out of alignment, e.g., a deflection under working loads of as much as 0.002 inch over the 14 inch length of the bearing mounting may occur. According to the invention, this is accommodated by self-aligning means for the bearing. According to one aspect of the invention, the bearing is mounted to the frame, supported only at its center so that it can rock slightly to become self-aligning.

According to another feature of the invention, self-aligning is achieved by a construction of the base to produce multiple self-compensating deflections of the base under the influence of the toggle, so that the net effect is to preserve parallelism of the portion of the base upon which the bearing is mounted. In other words the base becomes self-aligning by its inherent deflections serving to maintain proper alignment of the bearing with the toggle.

In the drawings:

FIG. 3 is a horizontal sectional view taken on line 3—3 of FIG. 2;

FIG. 4 is a perspective view, partially broken away, of one preferred embodiment achieving self-alignment of the frame bearing assembly;

FIGS. 5 and 6 are respectively vertical cross-sectional and horizontal cross-sectional views of the base and frame bearing assembly in another preferred embodiment achieving self-alignment of the bearing.

Figure 1:
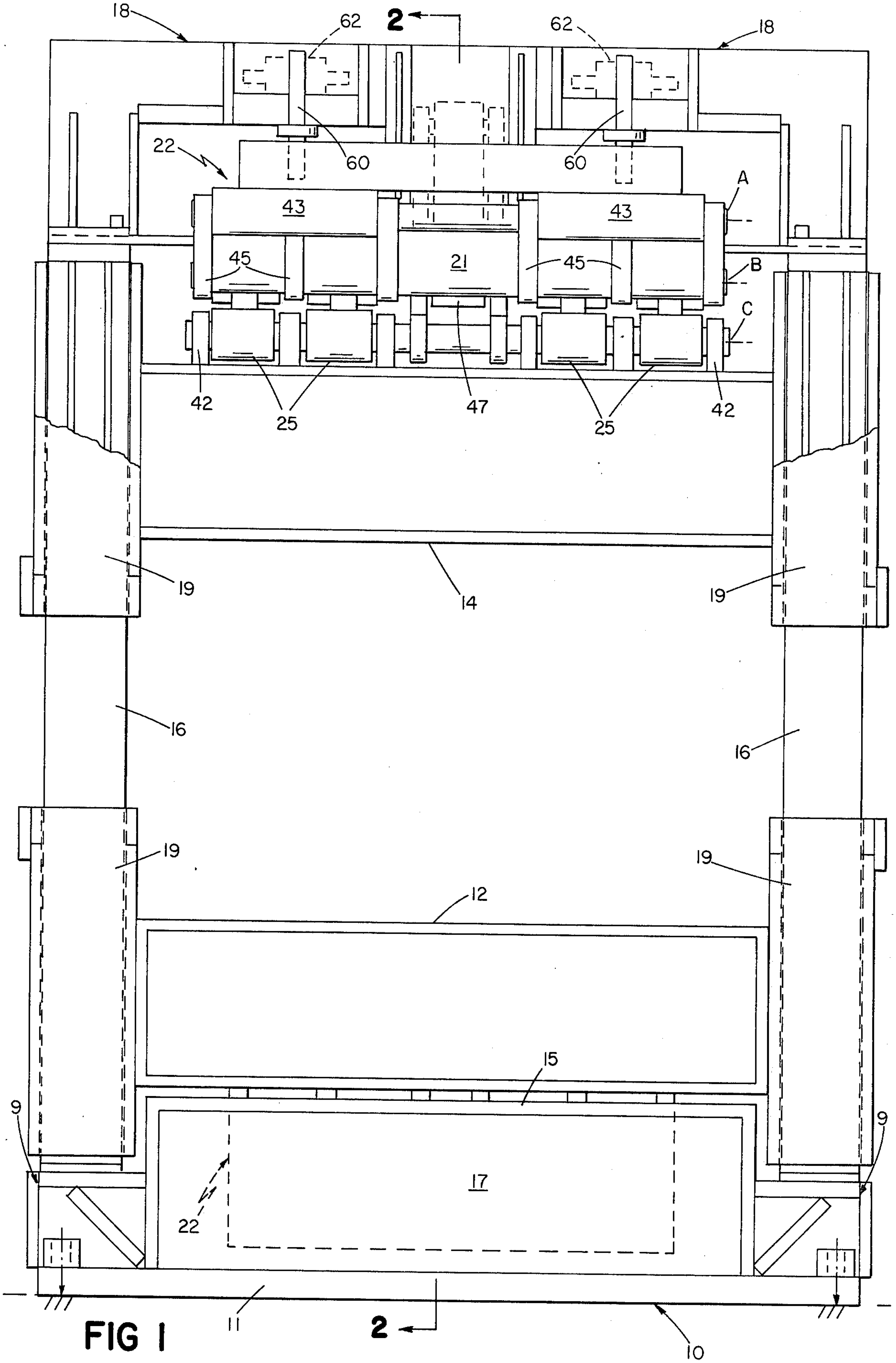
FIG. 1 is an elevational view of the preferred embodiment of the invention, viewed in the direction of web-travel through the machine.
Figure 2:
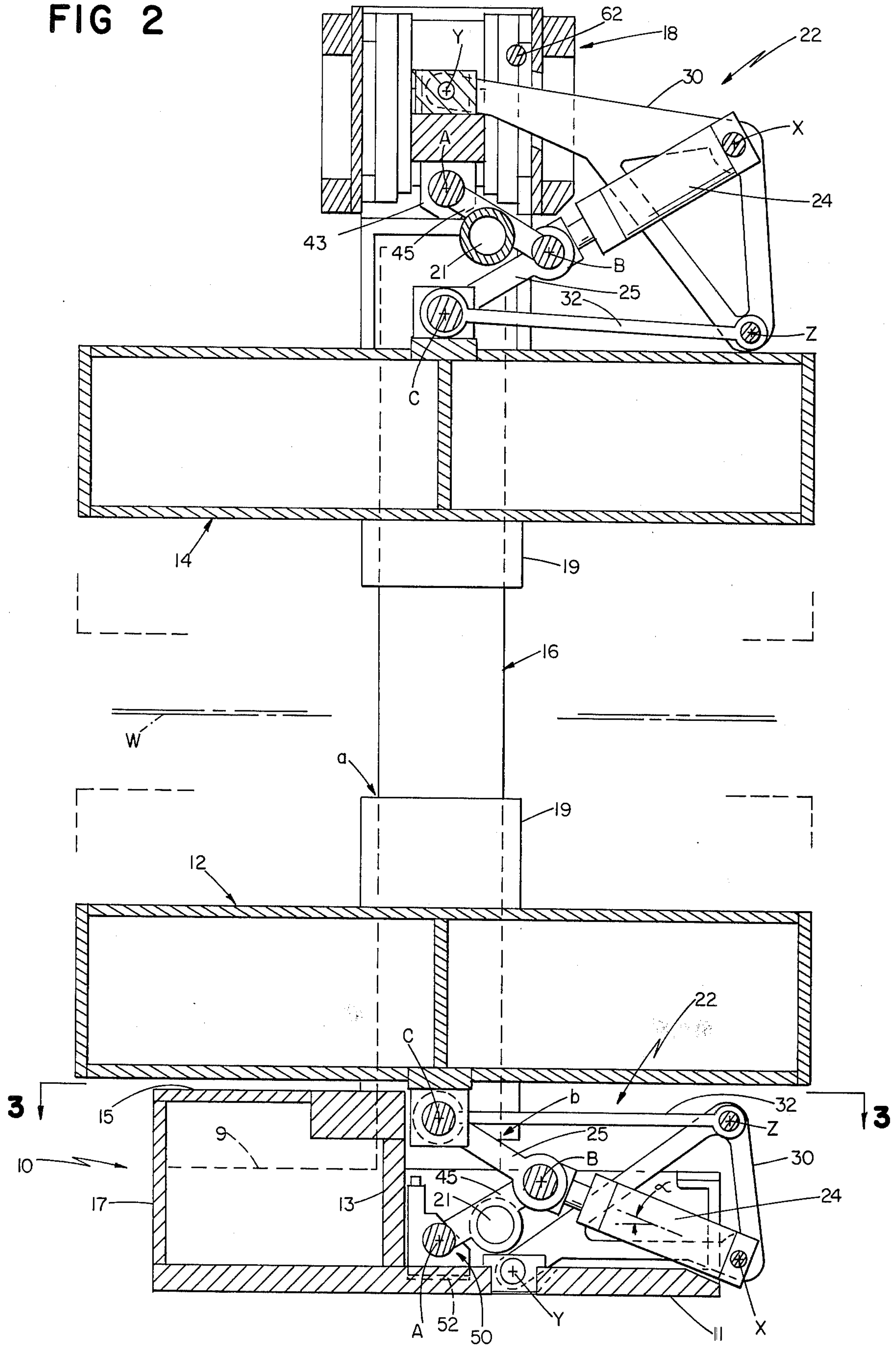
FIG. 2 is a vertical cross-sectional view, taken on line 2—2 of FIG. 1.

Referring now to FIGS. 1 and 2, the press of the embodiment incorporates lower platen 12, and upper platen 14 having guide tubes 19 sliding on columns or ways 16 connected at the top by crown 18 and at the bottom by base 10. Upper and lower toggles 20,22 are each actuated by a single cylinder 24 which is mounted on a reaction linkage comprising a "wiffletree" like lever 30 and link 32. As seen in FIG. 2 the base 10 is defined by a heavy base plate 11, e.g., 2 ½ inches thick steel plate, to the top of which is joined a "C" shaped structure defined by web 13, top 15 and side plate 17. Referring to FIG. 1 along the sides another box section 9 is joined to the top of the base plate, section 9 running along the ends of the main beam 10, and upon which the columns 16 are mounted. The platens comprise square box forms and the columns are rectangular. The guides of the platens on the columns comprise telescoping tubes 19 which surround the column and bolt to the plates. These guides are higher than the platen, e.g., the platen may be 12 or 15 inches high and the guides 30 inches, extending above and below the platen, as shown.

Each toggle linkage comprises a frame link 45 (in the form of a weldment made up of six arms and five connecting spacers 21), and a set of four platen links 25. The actuator cylinder is trunion-mounted at the cap end at point X to a "whiffletree" like lever 30, with pivots at each end, pivot Y mounted to the structure supporting the frame toggle and pivot Z mounted to a connecting link 32 which is connected at its other end to the platen. Pivot A is the stationary pivot of the toggle linkage, B is the center actuating pivot and C is the platen pivot. Thus the lever pivot X is fixed to the structure that supports pivot A and the connecting link, 32, a straight link, is connected to the pivot C.

Each toggle assembly in this embodiment is 48 inches wide, with four bearings at each shaft on the toggle located near the outer portion of the machine, whereas the cylinder load is in the center along the center line. The tendency for deflection along the toggle axis B, thus produced, is resisted by the stiffness provided by the torsion tubes 21 forming one of the two toggle links. The platen shaft C is fixed to the platen by means of six pillow blocks 42, three on each side. In each of the other spaces except at the center is a platen link 25 consisting of two hubs and a connecting column. For the frame pivot A there are two pairs of bearings, each pair mounted in a common pillow block 43, shaft A supported by those bearings, to which the six arms are rigidly joined of the frame link weldment.

The shaft B rigidly joins the other ends of the same arms of the frame link weldment and pivotally connects the four platen links. To its center is pivotally mounted the rod eye of the cylinder 24. The only adjustment is for the upper crown, for mold tolerances, made through screw jacks 60 one on each side. They are connected to a common gear train, via a wormwheel on each screw and linked together through a common wormshaft 62. The platen guides 19 resist the twisting of the platens in a longitudinal direction, e.g., about a transverse axis. Thereby loading these guides at diagonally opposite points, e.g., points a and b resisted by bearings M. Transversely, there are no significant loads at all. So according to this embodiment only one column guides the platens transversely, and this eliminates any interference from machining inaccuracy or temperature variations on the platens with respect to the frame. In other words there are bearings S on the inside and outside surfaces of one column 16 and none on the other. Therefore, if the platen grows or shrinks, it will not cause interference on the other column. The geometry of the reactive linkage ensures little or in fact no loads on the guides at the point at which the linkage is most heavily loaded (when the cylinder is fully open), as can be shown by force vector analysis. This occurs at the full open position when cushioning the inertial load of the platen.

Regarding the angle of the cylinder, for instance when the toggle is opened to 60°, a prior art cylinder acting on the midplane of the angle would have a ratio of 3.45 to 1. By angling the cylinder as shown 30°, which means the cylinder is in line with the platen link of the toggle when it is fully opened that disadvantage is reduced to 2:1; and when angled at 20°, the disadvantage is still reduced to about 2 ½ to 1. The cylinder force is highest when the cylinder is cushioning or decelerating the toggle and platen to its full open position. This is when the cylinder force can become as high as 35 to 50,000 pounds, from platen deceleration inertial loads being transferred through the oil to the mechanical members. The worst inertia force conditions and the worst mechanical condition are thus occurring simultaneously. The guide wear problem is most severe at this point too because the force is so high even though the travel at that point on the ways is not too great. With the upper geometry shown, with the Y pivot on the centerline, no side loads occur under this condition. The optimum position for the Y pivot is actually co-incident with the A pivot, in which case there is no side-loading on the ways for any toggle position, a condition not considered necessary in this particular embodiment where heavy wear-resistant guides are employed.

In the particular arrangement shown, the pivots are 8 inches apart on the centerline. With point Y on the centerline, the side force on the ways is zero only at full open position, in other words basically when the cylinder is cushioning and seeing its highest loading. As mentioned, this is effective in reducing the highest most wear condition of the press.

Thus it is seen that efficient use of actuator force and sound mechanical action are achieved by the invention.

As has been noted a further important object of the invention is to lower the operator level of the press for convenience and overall height for ease of shipping and maintenance, etc. In order to do so, the beam has been placed off to the side, and the toggle placed near the floor.

There is however a limit to the height of the beam even as it is off to the side because of need for a certain height of the platen for stiffness and a certain distance below the web line for stroke and die clearance. What space is left is where the base can go. As a result, in a practical design, beam deflection adversely affecting the frame bearing can occur.

According to the invention, this is dealt with by unique provision for self-alignment of the bearing.

Referring to FIG. 4, the cross-section of lower pillow block 50 is "L" shaped with corner filled in to give beam stiffness. It is 14 inches long (a 6 inch bearing at each end and a 2 inch slot in the center for the center-arm of the toggle frame), creating in effect a 14 inch long bearing assembly.

This pillow block 50 is set in a slot 52 in the base which locates in the machine (longitudinal) direction for resistance to movement under forces applied by the toggle.

Also there is produced at the center of the length of the pillow block a central rocker bearing portion 55 upon which the pillow block bears against the underneath supporting surface. It enables rocking of the pillow block, thus enabling the pillow block to be self-aligning with the toggle assembly despite deflection of the base upon which the pillow block rests.

As the pillow block is mounted off to the side of the beam, see FIG. 2, there will be some bending down of the base plate area directly under the pillow block, as a cantileved element, supported by the beam, to the left. The degree of this base plate deflection depends upon the distance of the point of application of the load, e.g., axis A, from the beam and especially web 13.

According to another feature of the invention, this deflection is employed to provide the desired self-compensating bearing alignment effect by varying the distance of the web 13 from the axis A along the length of the pillow block, thus to vary the resultant deflection along the length of the pillow block. For instance, in the preferred embodiment of this feature, the distance of the web from the centerline of forces is as shown in FIG. 5 at the center of the machine, with moment arm M, and, as seen in FIG. 6, progressing to the sides of the machine, the web is further removed from the center line of the pillow block, moment arm $M_2$, with the result of increased cantilever deflections of the base plate. The moment distances are chosen to cancel out the overall curvature of the beam as a whole in the lateral direction. Whether or not the web will be curved or straight, as shown, and the distances to be employed, depend upon the beam and overall machine geometry chosen for a particular design, which can be calculated using beam analysis techniques. In a particular embodiment, at the sides of the machine the web may be displaced, e.g., 3 or 4 inches, relative to the position in the center.

While this provision provides a straight reference parallel to the toggle axes, the corresponding upper surfaces of the base plate is twisted, so that when viewed from the lateral direction the base plate portion extending from the beam assumes different slope depending upon distance from the web. By providing the contact area shown in FIG. 6, in triangular form, the effective moment arm available can be increased, and instability of the pillow block prevented.

Referring to FIG. 6, it will be noted that a longitudinally extending stiffening structure is disposed at each longitudinal side of the main beam, joined to an extension of the base plate, and a slot 90 is cut in the base plate adjacent to the longitudinal structure isolating the structure's base-plate stiffening effect from the extension of the base-plate that is subject to the cantilever, compensating motion.

I claim:

1. A toggle press of the type comprising at least a lower platen mounted to move on guides of a frame between an open position accessible to a worker on the ground and a closed position in response to a toggle linkage, the toggle linkage comprising frame and platen links connected at pivots respectively on the frame and platen, the line between said pivots being parallel to the direction of said guides, said links joined at an intermediate actuating axis to which is also connected an actuator mounted on its other side to a second, reaction-force-absorbing linkage, said platen having a working face directed upwardly, the toggle linkage adapted to raise said platen to close said press,said second linkage comprising a lever and a link, said lever pivoted at one end at a fixed axis to the frame and at its other end to one end of said link, the other end of said link pivoted to the platen in the vicinity of said platen axis, said actuator extending between said toggle actuating axis and a reaction point located in the mid-region of said lever between its said end pivots, the improvement comprising the geometrical relationship of pivot axes providing enhanced actuator-to-toggle force ratio at toggle-open position without applying detrimental side loading on the platen, wherein said fixed axis of said lever is located in the direction perpendicular to the axis of said guides, closer to said line between centers of said frame and platen toggle axes than to the line between centers of said reaction point and the axis joining said link to said lever, and the line of action of said actuator, in the open position of said toggle, being inclined to the line bisecting the toggle angle defined at the actuating axis by the frame and platen toggle links, said inclination being in the direction downwardly progressing away from said toggle axis, toward the ground, and the fixed axis for the frame link of the toggle linkage being immediately adjacent to the ground, thereby enabling said open position to be at a convenient height to said worker.

2. The toggle press of claim 1 wherein said fixed axis of the lever is disposed off of but adjacent to the line of centers between the frame and platen pivots.

3. The toggle press of claim 1 wherein said press includes a base beam including a base plate and upper stiffening structure extending in the direction of the width of the press (i.e., transverse to the direction of travel of material entering the press), said base plate having an extension extending in the direction of said travel beyond said stiffening structure, the pivot on said frame for said frame link being mounted in a bearing supported on said base plate extension below the neutral axis of said beam.

4. The toggle press of claim 3 including means enabling self-alignment of said bearing relative to said frame link despite deflection of said base plate.

5. The toggle press of claim 3 including a depression for said base plate in locating a mounting for said fixed axis of said lever of said reaction-force-absorbing linkage, said axis of said lever being disposed lower than the pivot on said frame for of said frame link.

6. A toggle press of the type comprising at least a lower platen mounted to move on guides of a frame between an open position accessible to a worker on the ground and a closed position in response to a toggle linkage, the toggle linkage comprising frame and platen links connected at pivots respectively on the frame and platen, the line between said pivots being parallel to the direction of said guides, said links joined at an intermediate actuating axis to which is also connected an actuator mounted on its other side to a second, reaction-force-absorbing linkage, said platen having a working force directed upwardly, the toggle linkage adapted to raise said platen to close said press, and wherein said press includes a base beam including a base plate and upper stiffening structure extending in the direction of the width of the press (i.e., transverse to the direction of travel of material entering the press), said base plate having an extension extending in the direction of said travel beyond said stiffening structure, the pivot on said frame for said frame link being supported on said base plate extension below the neutral axis of said beam.

7. The toggle press of claim 6 including means enabling self-alignment of a bearing for said pivot relative to said frame link despite deflection of said base plate.

8. The toggle press of claim 7 wherein said bearing mounting is elongated in said transverse direction and a cross-section resistant to bending along said length, said bearing mounting being disposed upon a rocker element located midway of the length of said mounting, permitting said self-alignment.

9. The toggle press of claim 6 wherein said beam includes a transversely extending vertical web member joined to said base plate adjacent said extension of said base plate, said pivot on said base plate extension for said frame link being mounted on an elongated bearing mounting, the distance of said web member from said bearing mounting varying progressively over the length of said bearing mounting defining a progressively varying moment arm for cantilever deflection of said base plate extension relative to said web in varying amounts opposite to the overall deflection of said beam, constructed to compensate for said overall deflection to maintain alignment relative to said toggle linkage of the portion of the base plate supporting said bearing mounting.

10. The toggle press of claim 9 wherein said beam, under the load of said toggle closing, said press tends to force the center portion of the beam downwardly relative to the edges, and said web is angled to the transverse direction to produce progressive increase of the length of said moment arm outwardly transversely from the center of said press.

11. The toggle press of claim 9 includng longitudinally extending stiffening structure at a longitudinal side of said beam, joined to an extension of said base plate, and a cut in said base plate adjacent said longitudinal structure isolating the stiffening effect of said structure from said extension of said base-plate that is subject to said cantilever, compensating motion.

* * * * *

UNITED STATES PATENT AND TRADEMARK OFFICE

CERTIFICATE OF CORRECTION

PATENT NO. : 4,059,381

DATED : November 22, 1977

INVENTOR(S) : Charles M. Schott, Jr.

It is certified that error appears in the above-identified patent and that said Letters Patent are hereby corrected as shown below:

Col. 4, line 61, delete "most".

Col. 6, line 41, after "toggle", insert --actuating--.

Col. 6, line 63, "for said base plate in locating" should read --in said base plate for locating--.

Col. 6, line 66, delete "of".

Col. 7, line 10, "force" should be --face--.

Signed and Sealed this

*Fifteenth* Day of *January 1980*

[SEAL]

*Attest:*

SIDNEY A. DIAMOND

*Attesting Officer* *Commissioner of Patents and Trademarks*